United States Patent

Foresman

[11] Patent Number: 5,865,627
[45] Date of Patent: Feb. 2, 1999

[54] EDUCATION SYSTEM KIT

[76] Inventor: Guy Stuart Foresman, 603 Springbrook North, Irvine, Calif. 92614

[21] Appl. No.: 798,130

[22] Filed: Feb. 12, 1997

[51] Int. Cl.⁶ ..................................................... G09B 1/10
[52] U.S. Cl. ........................... 434/193; 434/191; 434/430
[58] Field of Search ................................. 434/191, 430, 434/209, 193, 190, 429; 40/594, 595, 610, 603, 622

[56] References Cited

U.S. PATENT DOCUMENTS

| | | | |
|---|---|---|---|
| 4,373,917 | 2/1983 | Jackson | 434/209 |
| 4,878,303 | 11/1989 | Banniza et al. | 40/610 X |
| 5,620,324 | 4/1997 | Rettke | 434/193 X |

*Primary Examiner*—Jeffrey A. Smith
*Attorney, Agent, or Firm*—G. Donald Weber, Jr.

[57] ABSTRACT

An educational system including a set of characters comprising foam numbers, operational symbols, and advanced problem solving activities each of which includes touch sensitive fasteners which can be applied to a collapsible, touch sensitive board. The set of math manipulatives permits a student to carry out all pre-algebraic calculations upon a vertical surface by using the touch fasteners to fasten the characters onto the collapsible touch sensitive board.

15 Claims, 2 Drawing Sheets

PLACE VALUE MARKERS

PLACE VALUE MARKERS ALLOW ANY NUMBER TO BE HIGHLIGHTED BY PLACING THE MARKER BEHIND THE NUMBER AND BRINGING ATTENTION TO ITS PLACE VALUE.

EDUCATION SYSTEM KIT

BACKGROUND

1. Field of the Invention

This invention is directed to a teaching aid, in general, and to an easy-to-use teaching aid for teaching mathematics to elementary school children, in particular.

2. Prior Art

There are many well known teaching aids available in the prior art. These include blackboards (with chalk), white boards (with magic markers), flannel cloths (with stick-on components), wood blocks, plastic blocks, magnetic blocks and foam-like blocks and/or shapes among many such products. Each of these teaching aids has advantages and disadvantages including cost, size, availability to teachers (or students) and the like. Some of these teaching aids are intimidating to students because of the size thereof (i.e. extremely large) and/or location thereof (i.e. in the front of the classroom). Some of these aids include heavy, difficult to use components.

It is always a desire by educators to be able to obtain and use teaching aids which are readily and easily used by students. It has been discovered that use of devices which are easily handled and manipulated by the teacher and the students enhances learning by, inter alia, encouraging participatory learning processes by the students.

Based upon this premise, it is highly desirable to utilize easily manipulatable, light weight, low cost teaching aids to increase learning traits of students—especially early elementary grade levels. The invention described herein is a highly successful example of such a teaching aid.

SUMMARY OF THE INSTANT INVENTION

The invention includes a set of characters fabricated of foam. The characters comprise, inter alia, numbers, letters, operational symbols and other symbols or components used to teach basic math skills and advanced problem solving skills. All characters (i.e. components and symbols) are designed to include touch sensitive fasteners which are adapted to readily and easily attach to and release from a touch sensitive board. In a preferred embodiment, the board is designed to be collapsible. The set includes a learning guide with grade level expectancies and learning games. Provided as a unit, the set is especially ideal for teaching mathematics to students at the elementary level. A suitable sack or other container is provided for ease of storing and/or transporting.

DESCRIPTION OF A PREFERRED EMBODIMENT

Figure 1:
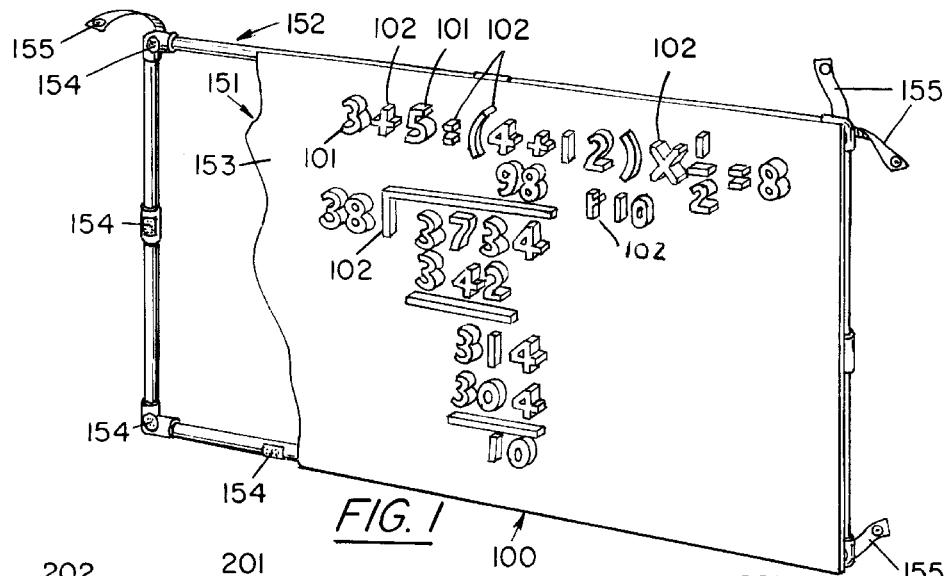
FIG. 1 is a partially broken away depiction of one embodiment of the instant invention.

Referring now to FIG. 1, there is shown a partially broken away, general representation of the instant invention, a math education product sometimes known by the trademark "FOAM FACTS[123]". The set 100 is composed of a plurality of pliable foam numbers 101 and symbols 102 as well as a touch sensitive support board 151. (Only a small, but representative, group of characters is shown.) These characters are fabricated with touch fasteners (described infra). Each number 101 and symbol 102 is able to be manually fastened to and released from the board 151 at will. The set allows students and teachers to explore and perform all pre-algebraic calculations. Two representative mathematical operations are shown in FIG. 1.

In a preferred embodiment, the board 151 is composed of a collapsible frame 152 (described infra) with a touch sensitive work surface 153 which spans, and is supported by, the entire frame 152 when assembled. Typically, the work surface 153 is comprised of a suitable material such as display loop which is compatible with so-called hook-and-loop fastening techniques. The work surface 153 is detachably affixed to the frame 152 by suitable fasteners 154 which are disposed at suitable locations on the frame 152. The fasteners 154 are, typically, formed of hook material (used with hook-and-loop fasteners) and securely—but detachably—attach the surface 153 to the frame.

In this embodiment, the frame 152 is intended to be collapsible and is comprised of a plurality of interlocking sections. Suitable sections can be fabricated of plastic tubes and fittings (e.g. PVC) which are known in the art. Once assembled, the board 151 measures 30"×42" in one embodiment (although other sizes are contemplated) and is able to be mounted vertically in two positions (i.e. the length of the board is disposed horizontally or vertically) using the incorporated tabs 155 which are fastened to the frame 152. In a preferred embodiment, the tabs 155 comprise elongated straps of hook-and-loop material and, as well, an eyelet rivet in the end thereof. The board 151 serves as the compatible work surface or area for the touch-and-release foam numbers, operational symbols, and other related components.

Figure 2A:
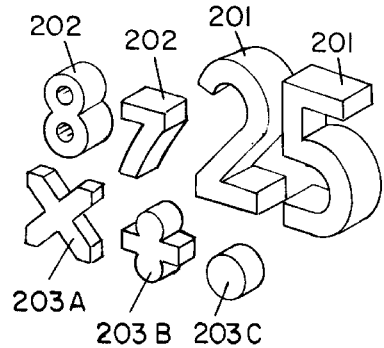
FIG. 2A shows perspective views of the front side of a plurality of components utilized with the instant invention.

Referring now to FIG. 2A, there are shown representations of active components, i.e. numbers, symbols and the like. As shown in FIG. 2A, all of the foam components of the set are approximately 1" thick. The set includes main or primary numbers 201 and carry or borrow numbers 202. The main or primary numbers, i.e. 0–9, are about 2½"×4". In this example, the numbers 2 and 5 of the primary numbers 201 are depicted. On the other hand, the carry/borrow numbers 202, also the numbers 0–9, are slightly smaller than the main/primary numbers at about 1½"×2". The carry/borrow numbers 8 and 7 are shown for example. The smaller size for the carry/borrow numbers 202 provides visual distinguishability from the primary numbers 201.

Other operational symbols and components (e.g. a multiplication sign 203A, a division sign 203B and a decimal point 203C), are formed of the foam material. These symbols are also about 1" thick and appropriately sized to function with the primary numbers. Preferrably, all operational symbols 203 and carry/borrow numbers 202 are of contrasting color relative to the color of the primary numbers 201 for ease of recognition. For example, the primary numbers can be blue while the carry/borrow numbers are yellow. Of course, any desirable coloration can be utilized.

Figure 2B:
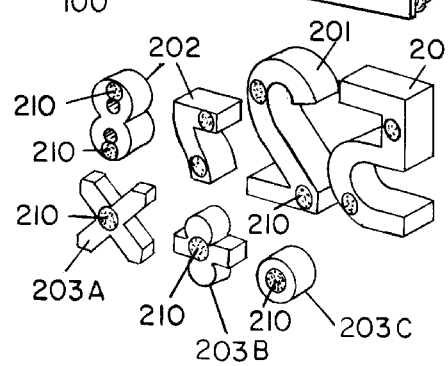
FIG. 2B shows perspective views of the reverse side of the components shown in FIG. 2A.

As shown in FIG. 2B, the components 201, 202 and 203 all include at least one touch fastener 210 on the reverse side thereof. The touch fasteners 210 are located in appropriate locations on the components to assure that the components adhere to the work surface 153.

Figure 3:
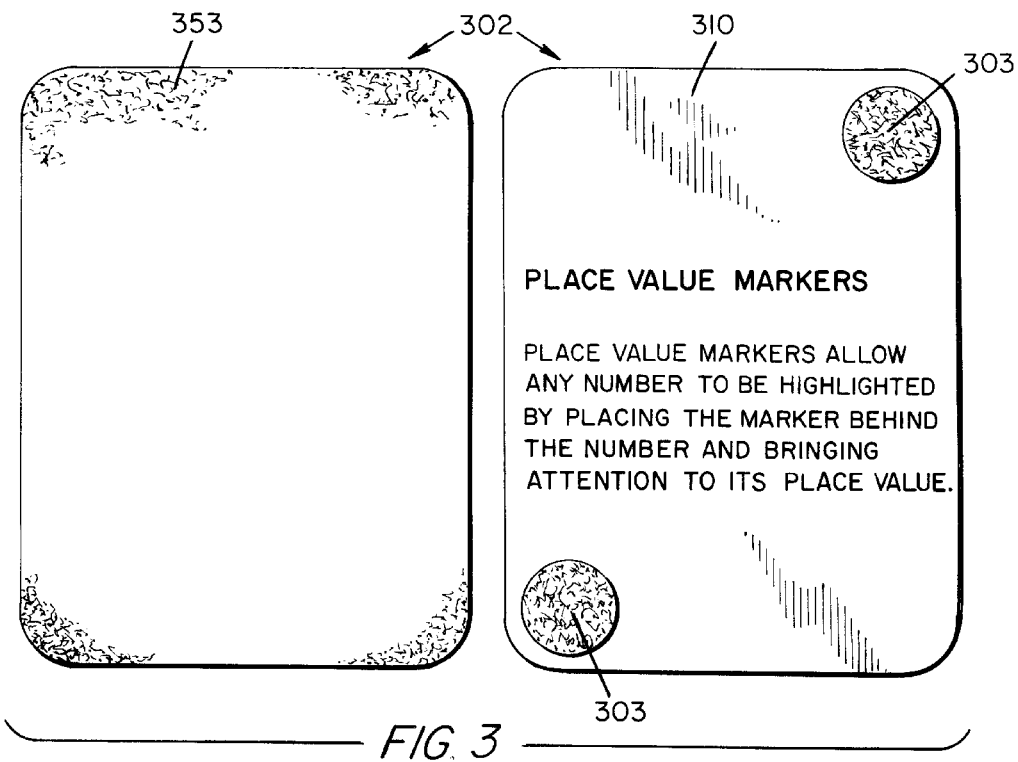
FIG. 3 is a showing of place value marker components of the instant invention.

As shown in FIG. 3, the set also includes place value markers 302. The place value markers 302 (two of which are included with the system) highlight any number and bring attention to the place value of the number. The place value markers measure 3"×4"×⅛" and are relatively flat and red in color. They are formed of a stiffening plastic support 310 with touch fasteners 303 on one side and touch sensitive material 353 on the other. This construction allows the markers to be attached to the board surface 153 by the touch fasteners 303 and, as well, to receive any of the numbers 201 or 202 onto the touch sensitive surface 153 thereof. Instructional information can be provided on the fastener side of the markers 302, if so desired.

Figure 4:
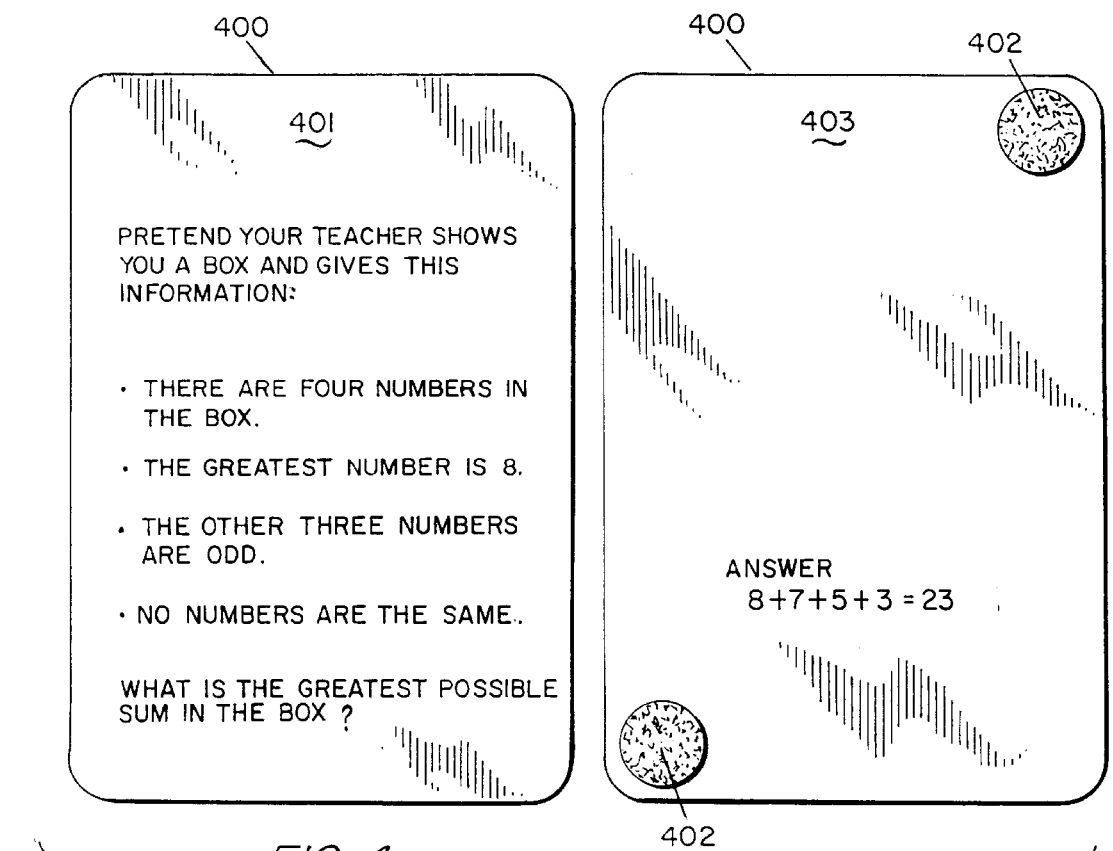
FIG. 4 is a representational showing of one embodiment of an instructional card incuded in the instant invention.

As shown in FIG. 4, the set also includes a number of "critical thinking" (or word problem) cards 400. These cards are, typically, thin plastic or laminated cards approximately 3½"×7"×⅛" with advanced problem solving activities (i.e. questions or tasks) printed one side 401 thereof. The cards 400 attach to the board 153 using touch fasteners 402 and are used to present students with open ended math problems which employ the use of the foam components contained within the set. The answer to the problem on side 401 of card 400 is displayed on side 403, the opposite side, of the card. Thus, the student can, after solving the problem, remove the card 400 from the surface 153, turn it over, and check his or her solution.

An optional learning guide may also be included within the set. The optional learning guide (not shown) presents teachers (and parents) with specific grade level math expectancies and a series of math learning games which can be used with the students. The games within the learning guide introduce and promote the math skill expectancies as related to the age and learning capabilities of the student.

All items of the set, including the board, fit within a 22"×25" mesh storage bag (not shown) for convenience in handling and storing.

A representative list of the set contents includes mathematical symbols for designating addition, subtraction, multiplication, division and the greater then/less than symbol. Also included are: division bracket, remainder "r", equals symbol, order of operation brackets, commas, place value markers, decimal points, 8-inch baselines, 11-inch baselines, 1-inch square cubes, primary numbers (0–9), carry numbers (0–9), critical thinking cards, a touch sensitive board (30"×42"), learning guide, and a carrying bag.

Figure 5:
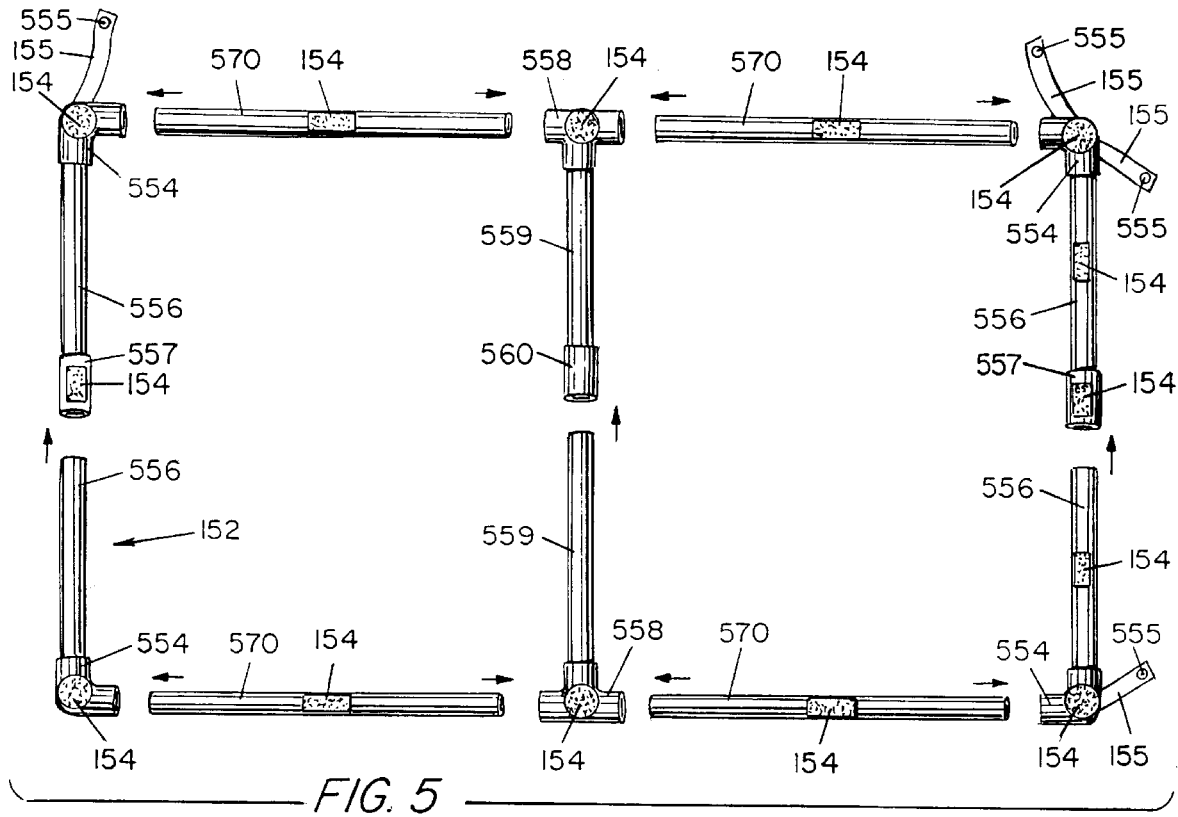
FIG. 5 is an exploded view of one embodiment of the support frame used with the instant invention.

Referring now to FIG. 5, there is shown an exploded view of the support frame 152. The frame includes four (4) L-shaped corner components 554. Three (3) of these corner components 554 have at least one strap 155 attached thereto. One corner has two (2) straps 155 attached thereto. In a preferred embodiment, the straps 155 are riveted to the respective corners 554. The straps 155 include metal eyelets or grommets 555 in the ends thereof. The grommets provide relatively strong mechanisms for mounting the frame 152 to hooks or the like. The straps 155 can also be fabricated of hook and loop material for attachment to counterpart strips. The counterpart mounting strips can be included with the system. Typically, these strips have an adhesive surface for mounting on a wall or the like.

In the preferred system, each corner 554 is attached to an arm 556 which extends from one side of the L-shaped corner component. The length of the arms 556 is about 14", although any desirable length is contemplated. A sleeve connector 557 is provided to join together the ends of two of the arms 556 to complete a side section of the frame 152.

The frame 152 also includes at least two (2) T-shaped intermediate connectors 558. An arm 559 is connected to the stem of each of the T-shaped connectors. A sleeve connector 560 is provided to join together the ends of the arms 559. When joined together, the arms 559, sleeve 560 and T-shaped connectors 558 are of the same length as the side sections of the frame 152 as formed by the arms 556, sleeve 557, and corners 554.

In addition, frame 152 includes a plurality of connector arms 570. The arms 570 are joined to the corner connectors 554 and the T-shaped connectors 558. The length of the connector arms is approximately 20", although this dimension is not critical and is a function of the desired frame size.

In the preferred embodiment, the components of the frame 152 are separable for ease in storing and handling. However, the frame can be rigidly constructed, if so desired.

As is shown, a plurality of securing tabs 154 are provided in the components of the frame 152. A securing tab is disposed on most (if not all) of the peripheral frame components. The tabs 154 are used to secure the fabric surface 153 (see FIG. 1) to the frame 152 when it is assembled.

In an alternative embodiment, the card 400 can be provided with the question and answer printed on the same side of a transparent card. Thus, the card can also be used as a transparency for an overhead projector, if desired. In this case, a pouch with touch fasteners 402 on one side thereof is provided. The pouch has a front side which covers the answer which is at the bottom of the card while permitting the question to be visible to the student.

Thus, there is shown and described a unique design and concept of an education system kit. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

I claim:

1. An educational system comprising,
a work surface,
at least one substantially planar component, and
a plurality of individually formed characters which are selectively and detachably mounted on said work surface,
said characters include fasteners thereon which selectively adhere to said work surface,
said characters are three-dimensional and are fabricated of a foam material,
said characters include the numerals 0 through 9 and at least one mathematical symbol.

2. The system recited in claim 1 wherein,
said work surface includes a material having a loop surface, and
said characters include a hook surface thereon.

3. The system recited in claim 2 wherein,
said work surface includes a support frame for supporting said material having a loop surface.

4. The system recited in claim 3 wherein,
said frame includes a plurality of hollow tubular sections.

5. The system recited in claim 4 wherein,
said hollow tubular sections are separably joined together.

6. The system recited in claim 4 wherein,
said support frame includes a plurality of coupling sections for coupling said hollow tubular sections together.

7. The system recited in claim 3 wherein, said support frame includes at least one element formed of a material having a hook surface which interacts with the loop surface of said work surface to form a hook and loop connection.

8. The system recited in claim 3 including, a plurality of mounting straps attached to said support frame.

9. The system recited in claim 1, wherein, said characters are formed in a plurality of sizes.

10. The system recited in claim 1 wherein, said planar component includes a material having a loop surface on one side thereof and at least one fastener on the opposite side thereof which fastener is adapted to selectively adhere to said work surface.

11. The system recited in claim 1 wherein, said planar component includes an instructional message on at least one surface thereof.

12. The system recited in claim 1 wherein, said planar component comprises a relatively flat and relatively stiff support.

13. The system recited in claim 12 wherein, said planar component comprises a thin plastic card with a mathematical word problem printed on one side thereof and an answer to said problem printed on the other side thereof.

14. The system recited in claim 1 wherein, said planar component is fabricated of a transparent material.

15. The system recited in claim 1 including, storage means for storing said work surface and said plurality of characters therein.

* * * * *